(12) United States Patent
Zeng et al.

(10) Patent No.: US 7,813,148 B2
(45) Date of Patent: Oct. 12, 2010

(54) POWER CONVERTER HAVING FLUX BIAS REGULATION METHOD

(75) Inventors: Jianhong Zeng, Shanghai (CN); Yuanyuan Zhang, Shanghai (CN); Aibin Qiu, Shanghai (CN); Kun Wei, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 444 days.

(21) Appl. No.: 11/834,828

(22) Filed: Aug. 7, 2007

(65) Prior Publication Data

US 2008/0198631 A1    Aug. 21, 2008

(30) Foreign Application Priority Data

Feb. 16, 2007   (TW)   ............................... 96106103 A

(51) Int. Cl.
*H02M 3/335* (2006.01)
(52) U.S. Cl. .................... 363/17; 363/56.03; 363/98
(58) Field of Classification Search .............. 363/17, 363/56.03, 98, 132
See application file for complete search history.

(56) References Cited

U.S. PATENT DOCUMENTS

| 4,748,550 | A * | 5/1988 | Okado | 363/98 |
| 6,356,461 | B1 * | 3/2002 | Jacobs | 363/17 |
| 6,400,580 | B1 * | 6/2002 | Bowman et al. | 363/17 |
| 7,529,108 | B2 * | 5/2009 | Bakker | 363/56.02 |
| 2008/0198631 | A1 * | 8/2008 | Zeng et al. | 363/17 |

* cited by examiner

*Primary Examiner*—Jeffrey L Sterrett

(57) ABSTRACT

Provided is a flux regulation method for use in a power converter, wherein the method is carried out by a flux bias controller. The flux bias controller includes a current detector which is configured to detect the primary current of the transformer of the power converter in a predetermined switching cycle, a DC bias processor which is configured to obtain the duty ratio control signal according to the sampled primary current outputted from the current detector for a switching cycle later than the predetermined switching cycle, and a PWM controller which is configured to generate driving signals to control the on/off operations of the switching circuit of the power converter according to the duty ratio control signal, thereby suppressing the DC bias of the transformer by regulating the duty ratio of the switch circuit.

18 Claims, 15 Drawing Sheets

POWER CONVERTER HAVING FLUX BIAS REGULATION METHOD

FIELD OF THE INVENTION

The present invention is related to a flux bias regulation method, and more particularly to a flux bias regulation method for use in a power converter and the power converter using such method.

BACKGROUND OF THE INVENTION

FIG. 1 shows the structure of a known phase-shifted full-bridge DC-DC converter. The phase-shifted full-bridge DC-DC converter includes a switching circuit consisted of four transistor switches Q1, Q2, Q3, Q4. The phase-shifted full-bridge DC-DC converter further includes an isolated transformer T1, a rectifier (D1, D2), and an output filter (Lf, Co). An input DC voltage Vin is converted into an AC voltage by the switching operation of the switching circuit (Q1, Q2, Q3, Q4), and the resultant AC voltage is delivered to the secondary side of the transformer T1. The AC voltage induced across the secondary side of the transformer T1 is converted into a desirable output DC voltage by the rectifier (D1, D2) and the output filter (Lf, Co), in which the output DC voltage is provided to the load 10.

When the transistor switches Q2 and Q4 within the phase-shifted full-bridge DC-DC converter are on, the primary current of the transformer T1 is flowing in a clockwise direction. In this case, the transformer T1 will undergo a positive magnetization process, and the ON-period of the transistor switches Q2 and Q4 is defined as the positive half-cycle of the magnetization process of the transformer T1. When the transistor switches Q1 and Q3 within the phase-shifted full-bridge DC-DC converter are on, the primary current of the transformer T1 is flowing in a counterclockwise direction. In this case, the transformer T1 will undergo a negative magnetization process, and the ON-period of the transistor switches Q1 and Q3 is defined as the negative half-cycle of the magnetization process of the transformer T1. During the magnetization process of the transformer T1, due to the switching characteristics of the switching circuit (Q1, Q2, Q3, Q4), such as the difference between the rising time and falling time of the switching circuit (Q1, Q2, Q3, Q4), the delay difference between the driving circuit of the switching circuit (Q1, Q2, Q3, Q4), and the asymmetry in the circuitry, the period of the positive magnetization process of the transformer T1 does not coincide with that of the negative magnetization process of the transformer T1. This would cause an imbalance between the volt-second product during the positive half-cycle of the magnetization process of the transformer T1 and the volt-second product during the negative half-cycle of the magnetization process of the transformer T1, thereby inducing a DC flux bias in the transformer T1. The DC flux bias of the transformer is prevalently existed in the converter having a transformer needing to be bi-directionally magnetized. The full-bridge DC-DC converter using PWM control technique and the push-pull DC-DC converter are suitable examples of such kind of power converter.

If the DC flux bias of the transformer T1 is not well regulated, the transformer T1 would be saturated. In order to suppress the bias current in the transformer T1, a DC blocking capacitor is placed at the primary side of the transformer T1 to block the bias current. As shown in FIG. 2, a DC blocking capacitor Cb is mounted at the primary side of the transformer T1. When the bias current flows through the DC blocking capacitor Cb, a DC voltage is induced across the DC blocking capacitor Cb. This DC voltage along with the input DC voltage Vin will be provided to the primary side of the transformer so as to carry out the magnetization process of the transformer T1. In this way, the bias current of the transformer T1 is suppressed. Nevertheless, the circuit of FIG. 2 requires an additional DC blocking capacitor Cb compared to the circuit of FIG. 1. In this case, the space occupied by the circuit components on the circuit board will increase and the power density of the power converter will decrease. In addition, the technique for suppressing the DC flux bias proposed by the scheme of FIG. 2 does not use an active manner to control the bias current.

Another solution to suppress the bias current of the transformer is to regulate the peak current of the primary current of the transformer in the positive half-cycle and the negative half-cycle to accomplish the flux bias regulation. According to this solution, the peak current of the primary current of the transformer in the positive half-cycle and the peak current of the primary current of the transformer in the negative half-cycle will be detected and regulated to be identical to the output of a feedback voltage loop (not shown in FIG. 1). Applying this solution to suppress the DC flux bias can ensure that the peak current of the primary current of the transformer in the positive half-cycle coincides with that in the negative half-cycle to be the same. Because the primary current of the transformer is consisted of the magnetizing current and the load current, the regulation over the peak current of the primary current can ensure that the magnetizing current in the positive half-cycle coincides with the magnetizing current in the negative half-cycle. Although this solution does not deteriorate the power density of the power converter, the peak current of the primary current in the current switching cycle has to be detected. Thus, this solution will pose a strict requirement on the real-time accuracy of current detection.

Therefore, it is necessary to propose a novel flux bias regulation method to efficiently suppress the DC bias current in the primary winding of the transformer without the need of a strict requirement on the real-time accuracy of current detection.

SUMMARY OF THE INVENTION

An object of the present invention is to provide a flux bias regulation method for calculating the bias current of the transformer in a switching cycle prior to a predetermined switching cycle according to the detected primary current of the transformer in the switching cycle prior to the predetermined switching cycle, and evaluating the bias regulation signal in the predetermined switching cycle according to the bias current of the transformer in the switching cycle prior to the predetermined switching cycle. Therefore, a pulse-width modulation controller can control the switching operation of the switching circuits within a power converter to suppress the DC bias of the transformer within the power converter.

Another object of the present invention is to provide a flux bias regulation method for compensating a feedback signal or a harmonic compensation signal according to the detected primary current of the transformer in a switching cycle prior to a predetermined switching cycle, thereby enabling a pulse-width modulation controller to control the switching operation of the switching circuits within a power converter to suppress the DC bias of the transformer within the power converter.

Another yet object of the present invention is to provide a power converter having a flux bias controller for performing the above-mentioned flux bias regulation method to suppress the DC bias of the transformer within the power converter.

According to a first embodiment of the present invention, a power converter includes a switching circuit for converting an input DC voltage into a first voltage according to its switching operation; a transformer having a primary side and a secondary side, in which the primary side is configured to receive the first voltage from the switching circuit and transfer the first voltage to the secondary side of the transformer according to the switching operation of the switching circuit; and a flux bias controller connected to the switching circuit for detecting the primary current of the transformer and obtaining a duty ratio control signal according to the detected primary current, and generating driving signals to drive the switching circuit according to the duty ratio control signal. The flux bias controller includes a current detector for detecting the primary current of the transformer in a switching cycle prior to a predetermined switching cycle; a DC bias processor connected to the current detector for obtaining a duty ratio control signal according to the output of the current detector in order to suppress the bias current of the transformer in the predetermined switching cycle; and a pulse-width modulation controller connected to the DC bias processor for generating driving signals to drive the switching circuit according to the duty ratio control signal.

According to the first embodiment of the present invention, the DC bias processor includes a DC bias calculation loop connected to the current detector for calculating the bias current of the transformer in the switching cycle prior to the predetermined switching cycle according to the output of the current detector; a DC bias regulation loop for calculating a bias regulation signal in the switching cycle prior to the predetermined switching cycle according to the bias current outputted from the DC bias calculation loop; a delay loop connected to the DC bias regulation loop for delaying the bias regulation signal to the predetermined switching cycle; a feedback voltage loop for detecting the variation on the output voltage of the power converter and in response thereto generating a feedback signal; and an adder/subtracter loop for performing adding/subtracting operation to the delayed bias regulation signal outputted from the delay loop and the feedback signal outputted from the feedback voltage loop so as to generate a duty ratio control signal.

According to a second embodiment of the present invention, the DC bias processor includes a delay circuit connected to the current detector for delaying the output of the current detector for at least one switching cycle; a feedback voltage loop for detecting the variation on the output voltage of the power converter and in response thereto generating a feedback signal; and an adder/subtracter loop for adding the output of the delay circuit and a harmonic compensation signal together to generate a composite signal.

According to another aspect of the second embodiment of the present invention, the DC bias processor includes a delay circuit connected to the current detector for delaying the output of the current detector for at least one switching cycle; a feedback voltage loop for detecting the variation on the output voltage of the power converter and in response thereto generating a feedback signal; and an adder/subtracter loop for subtracting the output of the delay circuit from the feedback signal to generate a differential signal.

The flux bias controller according to the present invention is configured to perform a flux bias regulation method. According to the first embodiment of the present invention, the flux bias regulation method is applied to a power converter having a switching circuit and a transformer, in which the switching circuit is configured to turn on and off according to a predetermined period and the transformer is configured to undergo bi-directional magnetization according to the switching operation of the switching circuit. The flux bias regulation method includes the steps of: detecting the primary current of the transformer in the switching cycle (n−a)Ts and the primary current of the transformer in the switching cycle (n−b)Ts prior to a predetermined switching cycle nTs, where n is a positive integer, Ts is the switching period, a and b are both a positive integer, and n>b and b≧a; calculating the bias current in the switching cycle (n−b)Ts prior to the predetermined switching cycle nTs according to the detected primary currents; calculating a bias regulation signal in the predetermined switching cycle nTs according to the bias current in the switching cycle (n−b)Ts prior to the predetermined switching cycle nTs; processing the bias regulation signal and a feedback signal to obtain a duty ratio control signal; and enabling a pulse-width modulation controller to issue driving signals to drive the switching circuit according to the duty ratio control signal, thereby regulating the duty ratio of the switching circuit and suppressing the DC bias of the transformer.

In a first aspect of the second embodiment of the present invention, a flux bias regulation method is applied to a power converter having a switching circuit and a transformer, in which the switching circuit is configured to turn on and off according to a predetermined period and the transformer is configured to undergo bi-directional magnetization according to the switching operation of the switching circuit. The method includes the steps of: detecting the primary current of the transformer in the switching cycle (n−b)Ts prior to a predetermined switching cycle nTs; delaying the detected primary current for at least one switching cycle; adding the delayed current signal and a harmonic compensation signal together to generate a composite signal; and comparing the composite signal with a feedback signal so as to generate a driving signal to drive the switching circuit, thereby regulating the duty ratio of the switching circuit to suppress the DC bias of the transformer.

In a second aspect of the second embodiment of the present invention, a flux bias regulation method is applied to a power converter having a switching circuit and a transformer, in which the switching circuit is configured to turn on and off according to a predetermined period and the transformer is configured to undergo bi-directional magnetization according to the switching operation of the switching circuit. The method includes the steps of: detecting the primary current of the transformer in the switching cycle (n−b)Ts prior to a predetermined switching cycle nTs; delaying the detected primary current for at least one switching cycle; subtracting the delayed current signal from a feedback signal to generate a differential signal; and comparing the differential signal with a harmonic compensation signal so as to generate a driving signal to drive the switching circuit, thereby regulating the duty ratio of the switching circuit to suppress the DC bias of the transformer.

Now the foregoing and other features and advantages of the present invention will be best understood through the following descriptions with reference to the accompanying drawings, wherein:

DETAILED DESCRIPTION OF THE PREFERRED EMBODIMENT

Several preferred embodiments embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
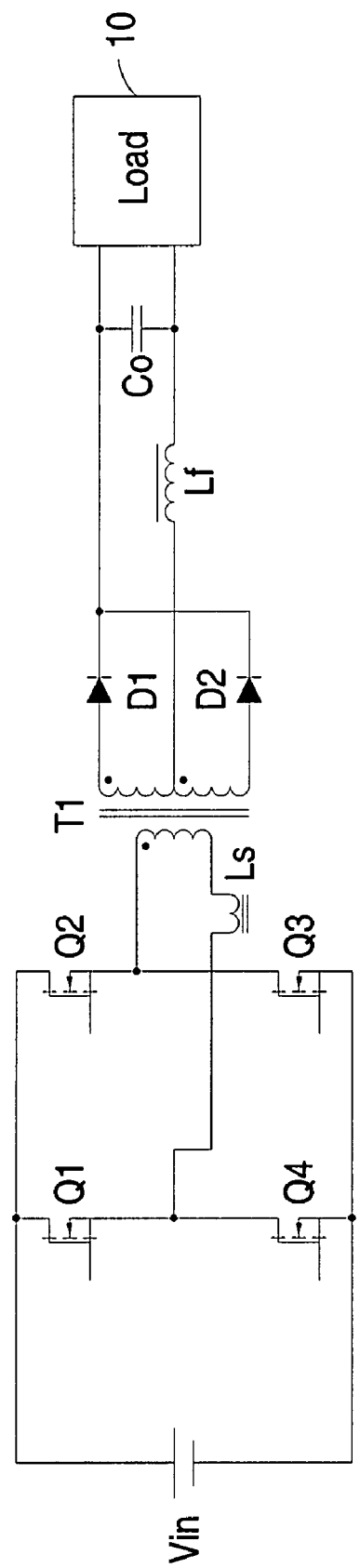
FIG. 1 is a circuit diagram showing the structure of a known phase-shifted full-bridge DC-DC converter.
Figure 2:
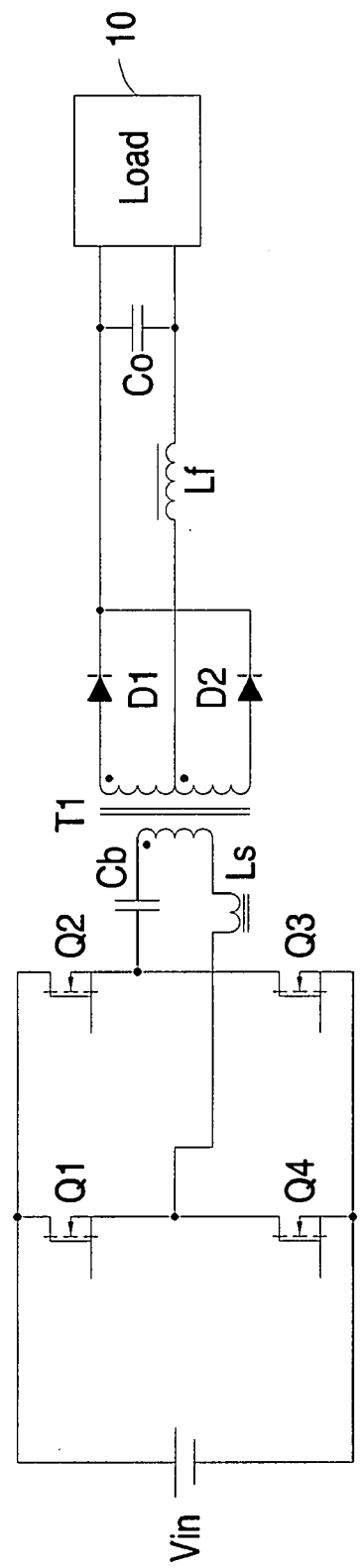
FIG. 2 is a circuit diagram showing the structure of a conventional phase-shifted full-bridge DC-DC converter having a DC blocking capacitor for suppressing DC bias of the transformer.
Figure 3:
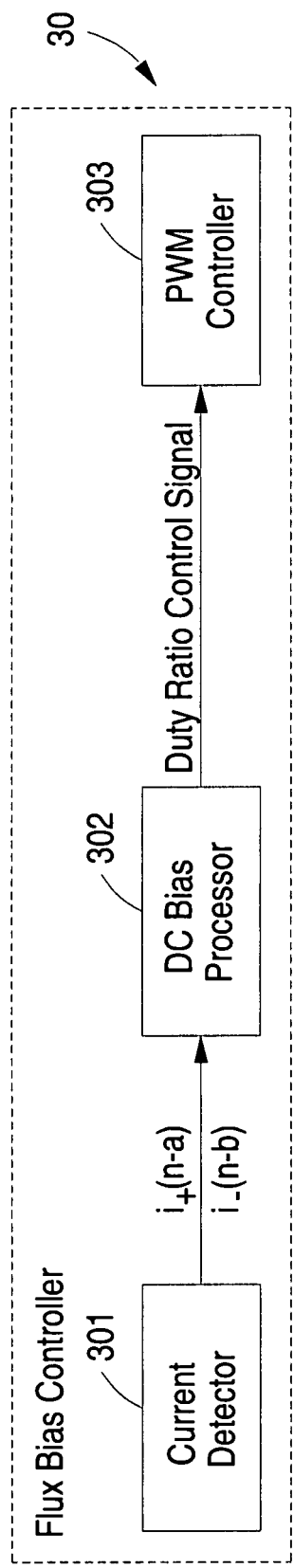
FIG. 3 is a generalized systematic block diagram of the flux bias controller according to the present invention.

Please refer to FIG. 1 and FIG. 3, wherein a generalized systematic block diagram of the flux bias controller according to the present invention is shown in FIG. 3. The flux bias controller 30 of FIG. 3 is configured to regulate the DC flux bias of the transformer T1 of the phase-shifted full-bridge DC-DC converter of FIG. 1, and is connected to the switching circuit (Q1, Q2, Q3, Q4) of FIG. 1. As shown in FIG. 3, the flux bias controller 30 according to the present invention includes a current detector 301 for detecting the primary current $I_+(n-a)$ of the transformer T1 during the positive half-cycle of the $(n-a)^{th}$ switching cycle $(n-a)Ts$ and the primary current $I_-(n-b)$ of the transformer T1 during the negative half-cycle of the $(n-b)^{th}$ switching cycle $(n-b)Ts$, where the current $I_+(n-a)$ and the current $I_-(n-b)$ are both greater than zero, (n, a, b) are all positive integers, (n>a, b) and (b>a), and Ts is the switching period of the switching circuit (Q1, Q2, Q3, Q4). The flux bias controller 30 further includes a DC bias processor 302 for analyzing and processing the sampled current signal outputted from the current detector 301 to generate a desirable duty ratio control signal, and a PWM controller 303 for regulating the duty ratio of the switching circuit (Q1, Q2, Q3, Q4) in the $n^{th}$ switching cycle, so as to regulate the DC flux bias of the transformer T1.

Figure 4:
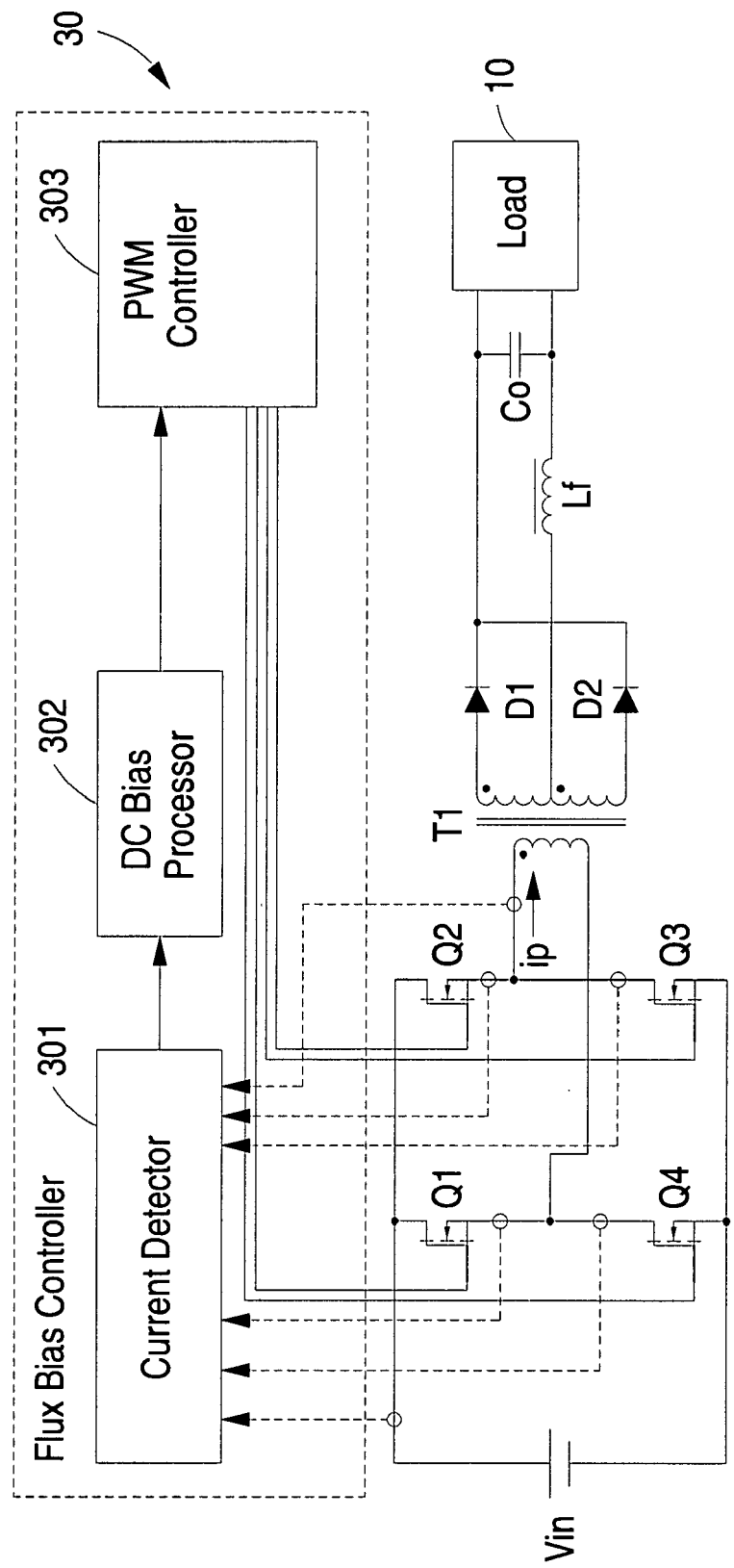
FIG. 4 is a circuit diagram showing the structure of a full-bridge DC-DC converter incorporating the flux bias controller of FIG. 3.

FIG. 4 illustrates the structure of a full-bridge DC-DC converter incorporating the flux bias controller 30 of FIG. 3. In FIG. 4, the transistor switches Q1 and Q4 form a leading leg and the transistor switches Q2 and Q3 form a lagging leg. In addition, the primary current of the transformer T1 is consisted of a load current and a magnetizing current. When the DC flux bias takes place, the flux bias controller 30 can detect the primary current of the transformer T1 to perform flux bias regulation. As shown in FIG. 4, the detection on the primary current of the transformer T1 in the present embodiment can be achieved by detecting the bus current, the leading leg current flowing through the leading leg, the lagging leg current flowing through the lagging leg, or the primary current flowing through the primary winding of the transformer T1 so as to obtain the input information for performing flux bias regulation.

Figure 5:
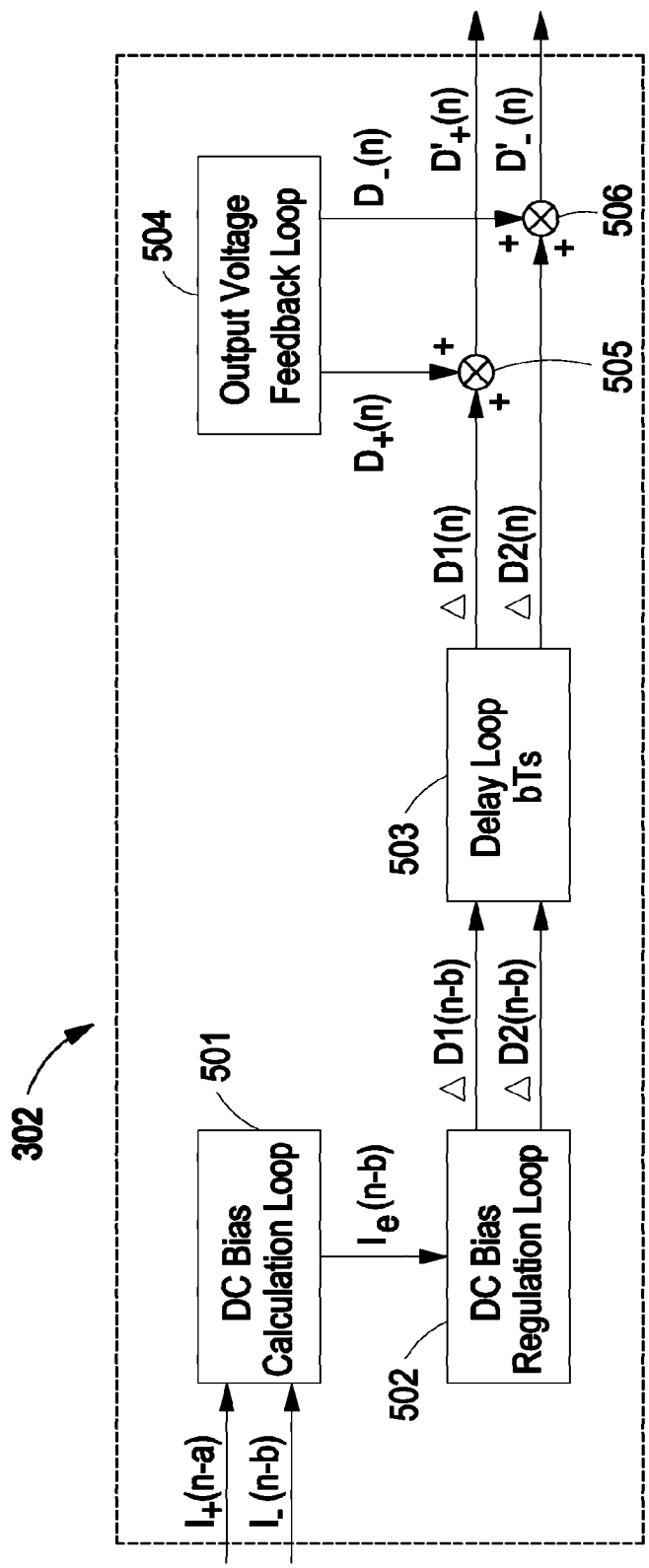
FIG. 5 shows the structure of the DC bias processor according to a first embodiment of the present invention.

In a first embodiment of the present invention, the implementation of the DC bias processor 302 can be used to achieve the flux bias regulation method by calculating the bias current and generating a bias regulation signal accordingly. FIG. 5 shows an algorithmic frame of the DC bias processor according to the first embodiment of the present invention. Referring to FIG. 1, FIG. 3 and FIG. 5, the DC bias processor 302 includes a DC bias calculation loop 501 that is configured to calculate the bias current $I_e(n-b)$ of the transformer T1 in the $(n-b)^{th}$ switching cycle $(n-b)Ts$ according to the sampled primary current $I_+(n-a)$ and $I_-(n-b)$ outputted from the current detector 301 as $I_e(n-b)=f[I_+(n-a)-I_-(n-b)]$, where f is the function defining the relationship among the sampled primary current $I_+(n-a)$ in the positive half-cycle of the $(n-a)^{th}$ switching cycle $(n-a)Ts$ and the sampled primary current $I_-(n-b)$ in the negative half-cycle of the $(n-b)^{th}$ switching cycle $(n-b)Ts$ and the bias current $I_e(n-b)$ in the $(n-b)^{th}$ switching cycle $(n-b)Ts$. Considering the variations on the primary current of the transformer T1 in different switching cycles, the absolute value of (a–b) in the present embodiment is better not to exceed a predetermined value, for example, 10. Certainly, the bias current $I_e(n-b)$ can be defined as $I_e(n-b)=f[I_-(n-a)-I_+(n-b)]$, that is, the bias current $I_e(n-b)$ in the $(n-b)^{th}$ switching cycle $(n-b)Ts$ is derived according to the sampled primary current $I_-(n-a)$ in the negative half-cycle of the $(n-a)^{th}$ switching cycle $(n-a)Ts$ and the sampled primary current $I_+(n-b)$ in the positive half-cycle of the $(n-b)^{th}$ switching cycle $(n-b)Ts$. The DC bias processor 302 further includes a DC bias regulation loop 502 that is configured to calculate a bias regulation signal according to the bias current $I_e(n-b)$ outputted from the DC bias calculation loop 501, where the bias regulation signal $\Delta D1(n-b)$ in the positive half-cycle of the $(n-b)^{th}$ switching cycle is derived according to the formula of $\Delta D1(n-b)=f'(I_e(n-b))$ and bias regulation signal $\Delta D2(n-b)$ in the negative half-cycle of the $(n-b)^{th}$ switching cycle is derived according to the formula of $\Delta D2(n-b)=f''(I_e(n-b))$, where f' is the function defining the relationship between the bias current in the $(n-b)^{th}$ switching cycle and the bias regulation signal in the positive half-cycle of the $(n-b)^{th}$ switching cycle, and f'' is the function defining the relationship between the bias current in the $(n-b)^{th}$ switching cycle and the bias regulation signal in the negative half-cycle of the $(n-b)^{th}$ switching cycle. The bias regulation signal outputted from the DC bias regulation loop 502 will be inputted to a delay loop 503 so that the bias regulation signal in the positive half-cycle and the bias regulation signal in the negative half-cycle of the $(n-b)^{th}$ switching cycle can be respectively delayed until the $n^{th}$ switching cycle. Therefore, we obtain $\Delta D1(n)=\Delta D1(n-b)$ and $\Delta D2(n)=\Delta D2(n-b)$, where ΔD1(n) is the bias regulation signal in the positive half-cycle of the $n^{th}$ switching cycle and ΔD2(n) is the bias regulation signal in the negative half-cycle of the $n^{th}$ switching cycle. In addition, the DC bias processor 302 further includes a feedback voltage loop 504 that is configured to detect the variations on the output voltage of the DC-DC converter to calculate the feedback signal in the positive half-cycle of the $n^{th}$ switching cycle and the feedback signal in the negative half-cycle of the $n^{th}$ switching cycle. Here, the feedback signal in the positive half-cycle of the $n^{th}$ switching cycle and the feedback signal in the negative half-cycle of the $n^{th}$ switching cycle are respectively denoted by the notation of $D_+(n)$ and $D_-(n)$. Therefore, both of the duty ratio control signal $D'_+(n)$ in the positive half-cycle of the $n^{th}$ switching cycle and the duty ratio control signal $D'_-(n)$ in the negative half-cycle of the $n^{th}$ switching cycle are the sum of the feedback signal and their respective bias regulation signal, that is, $D'_+(n)=D_+(n)+\Delta D1(n)$ and $D'_-(n)=D_-(n)+\Delta D_2(n)$. In FIG. 5, the DC bias processor 302 further includes a pair of adder/subtracter loops 505 and 506 that are configured to perform adding or subtracting operation to the feedback signals $D_+(n)$ and $D_-(n)$ and the bias regulation signals ΔD1(n) and ΔD2(n) so as to obtain the duty ratio control signal $D'_+(n)$ and $D'_-(n)$. Therefore, the pulse-width modulation controller 303 can generate driving signals to drive the switching circuit (Q1, Q2, Q3, Q4) according to the duty ratio control signals $D'_+(n)$ and $D'_-(n)$.

Figure 6:
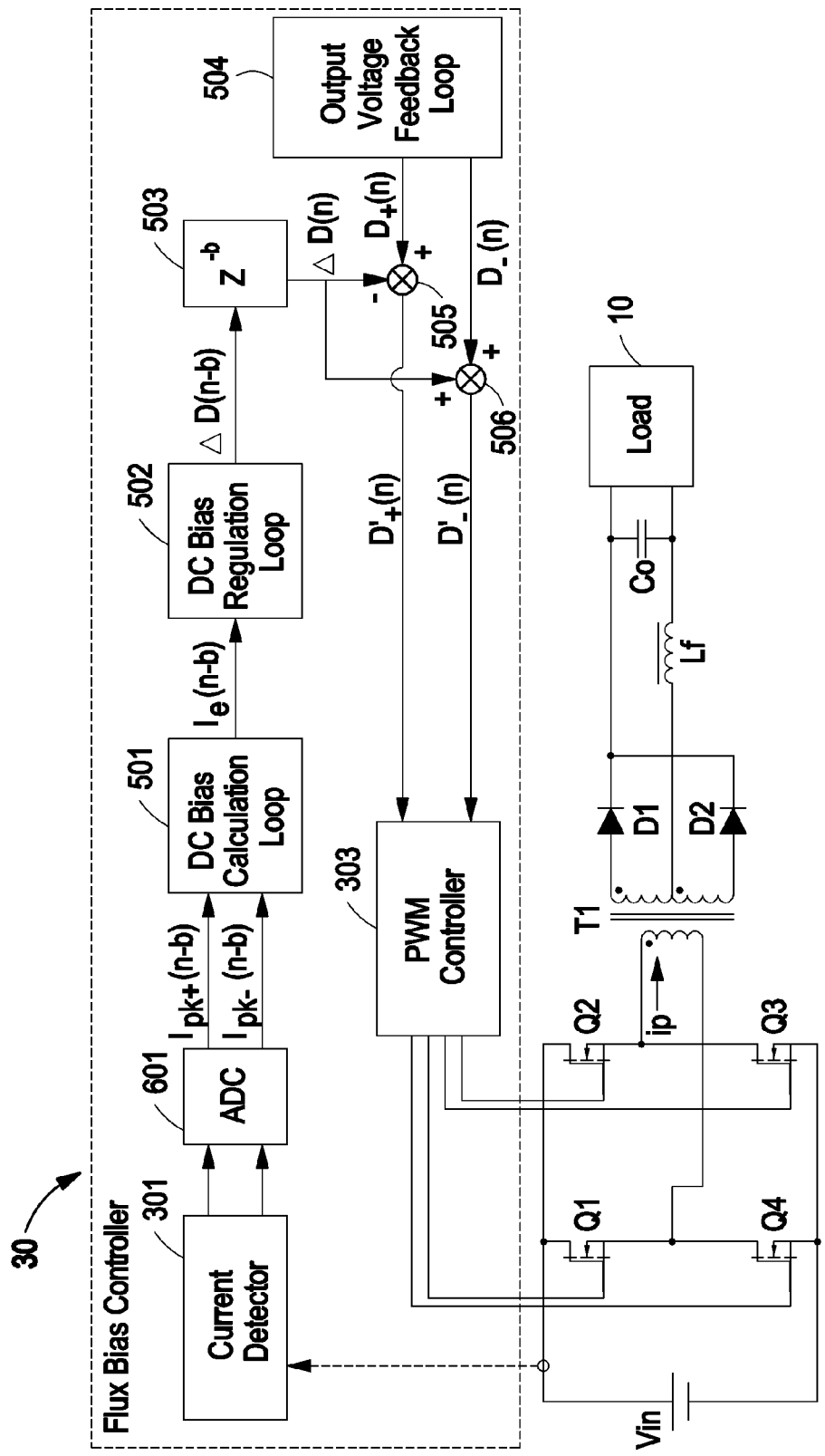
FIG. 6 is a circuit diagram showing a phase-shifted full-bridge DC-DC converter incorporating a flux bias controller that is implemented in the manner of digital processing.

FIG. 6 is a circuit diagram illustrating the scheme that the flux bias controller 30 is implemented in a manner of digital processing and applied to a phase-shifted full-bridge DC-DC converter. As shown in FIG. 6, the flux bias controller 30 includes a current detector 301 for detecting the peak current $I_{pk+}(n-b)$ of the bus current in the positive half-cycle and the peak current $I_{pk-}(n-b)$ of the bus current in the negative half-cycle of the same switching cycle, that is, the $(n-b)^{th}$ switching cycle. The peak bus current sampled by the current detector 301 is the information presented in an analog format, which is then converted into a digital format by an analog-to-digital converter (ADC) 601. The output of the analog-to-digital converter 601 is fed to the DC bias calculation loop 501 to calculate the bias current $I_e(n-b)$ in the $(n-b)^{th}$ switching cycle as $I_e(n-b)=I_{pk+}(n-b)-I_{pk-}(n-b)$. Next, the DC bias regulation loop 502 will calculate the bias regulation signals ΔD1(n−b) and ΔD2(n−b) in the $(n-b)^{th}$ switching cycle according to the bias current $I_e(n-b)$. Next, the delay loop 503 will delay the bias regulation signals ΔD1(n−b) and ΔD2(n−b) until the $n^{th}$ switching cycle so as to obtain the bias regulation signals ΔD1(n) and ΔD2(n), thereby compensating the feedback signal outputted from the feedback voltage loop 504, where ΔD1(n) and ΔD2(n) are the bias regulation signal in the positive half-cycle of the $n^{th}$ switching cycle and that in the negative half-cycle of the $n^{th}$ switching cycle, respectively. In order to prevent additional ripples from being superimposed on the output voltage of the phase-shifted full-bridge DC-DC converter during the bias regulation process, the absolute value of the bias regulation signal in the positive half-cycle of the $n^{th}$ switching cycle must be equal to that in the negative half-cycle of the $n^{th}$ switching cycle, that is, ΔD1(n)=−ΔD2(n)=ΔD(n). Therefore, through the computation performed by adder/subtracter loops 505 and 506, the duty ratio control signal $D'_+(n)$ in the positive half-cycle of the $n^{th}$ switching cycle is set as $D_+(n)-\Delta D(n)$, and the duty ratio control signal $D'_-(n)$ in the negative half-cycle of the $n^{th}$ switching cycle is set as $D_-(n)+\Delta D(n)$. Besides, if the influence of the bias regulation on the voltage ripple superimposed on the output voltage of the phase-shifted full-bridge DC-DC converter is not taken into account, it is only necessary to perform compensation on either the duty ratio control signal $D'_+(n)$ in the positive half-cycle or the duty ratio control signal $D'_-(n)$ in the negative half-cycle. That is to say, the duty ratio control signal $D'_+(n)$ in the positive half-cycle of the $n^{th}$ switching cycle can be set as $D_+(n)-\Delta D(n)$ and the duty ratio control signal $D'_-(n)$ in the negative half-cycle of the $n^{th}$ switching cycle can be set as $D_-(n)$. Alternatively, the duty ratio control signal $D'_+(n)$ in the positive half-cycle of the $n^{th}$ switching cycle can be set as $D_+(n)$ and the duty ratio control signal $D'_-(n)$ in the negative half-cycle of the $n^{th}$ switching cycle can be set as $D_-(n)+\Delta D(n)$.

Figure 7:
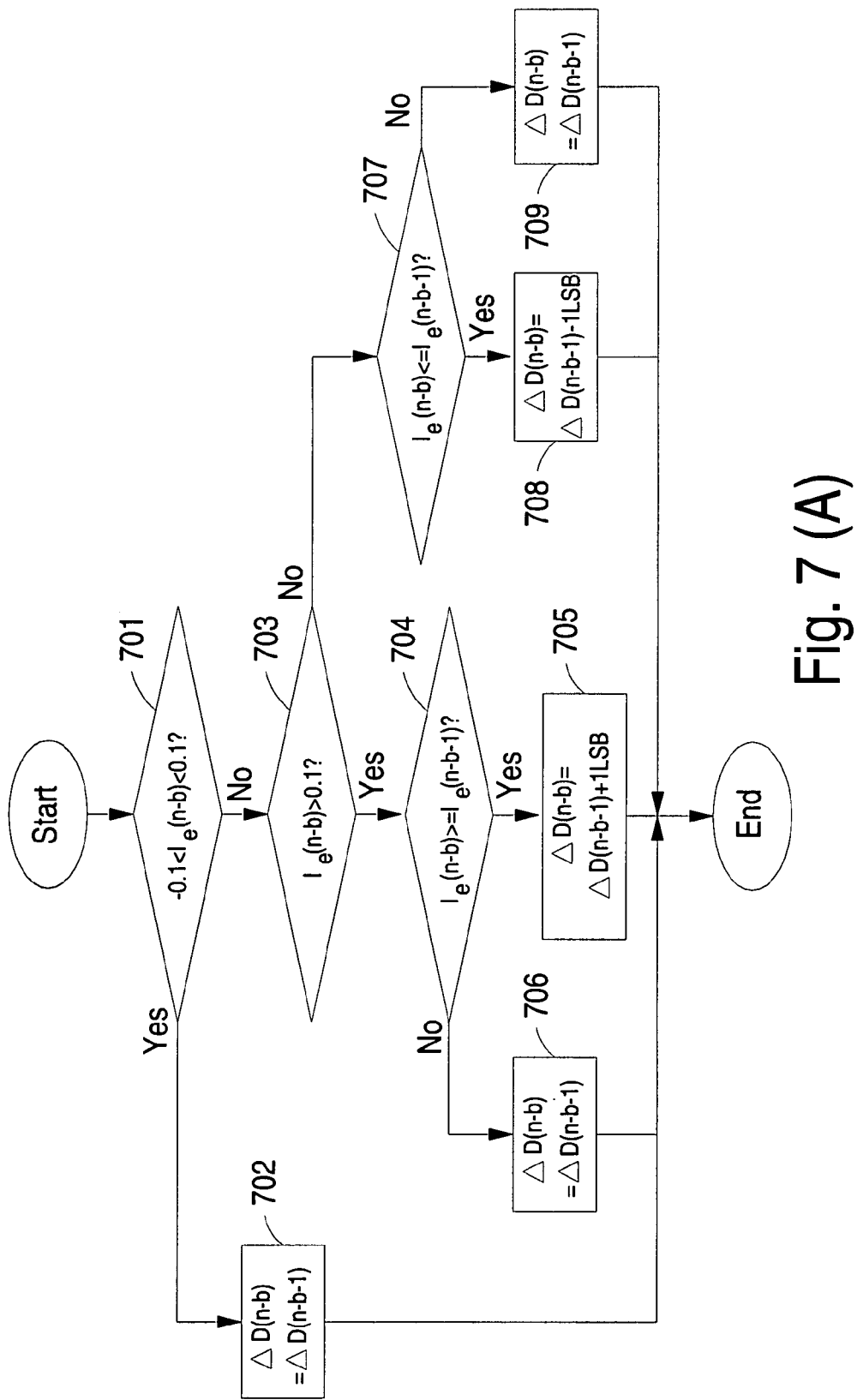
FIG. 7(A) is a flowchart illustrating the steps of a procedure for calculating the bias regulation signal by the DC bias regulation loop of FIG. 5.
FIG. 7(B) is a flowchart illustrating the steps of a simplified procedure for calculating the bias regulation signal by the DC bias regulation loop of FIG. 5.
FIG. 7(C) is a flowchart illustrating the steps of a simplified procedure for calculating the bias regulation signal by the DC bias regulation loop of FIG. 5.
Figure 7:
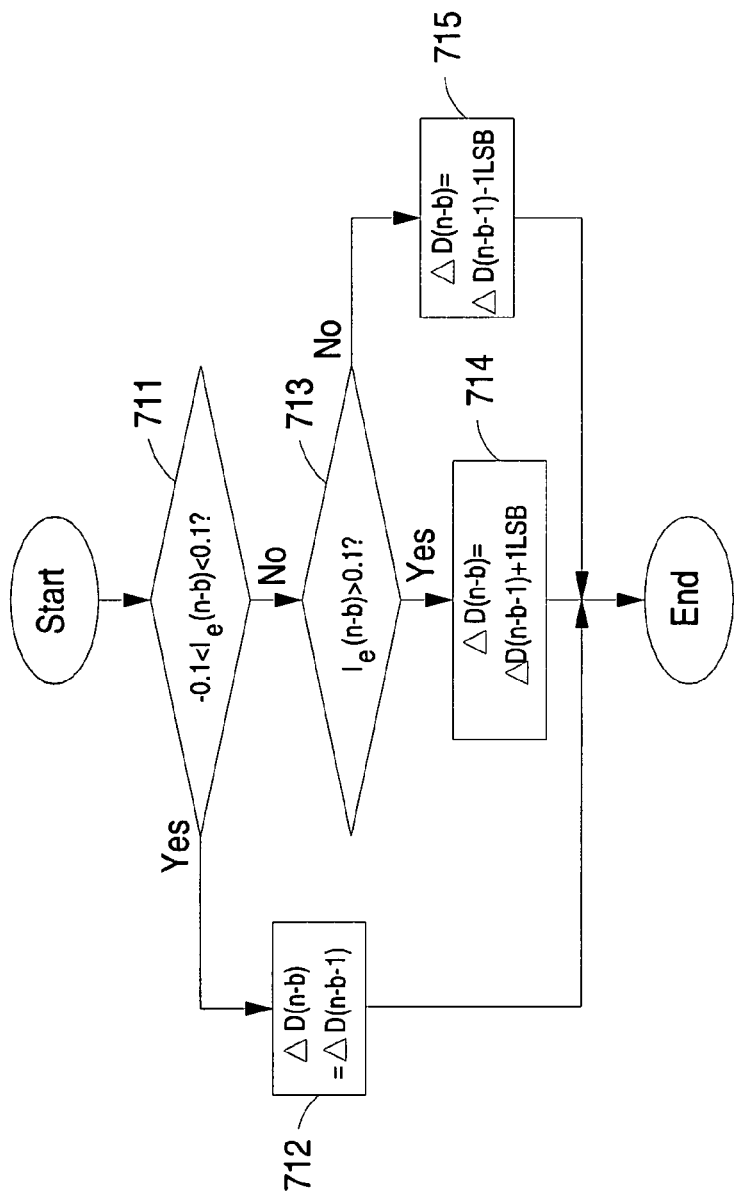
Figure 7:
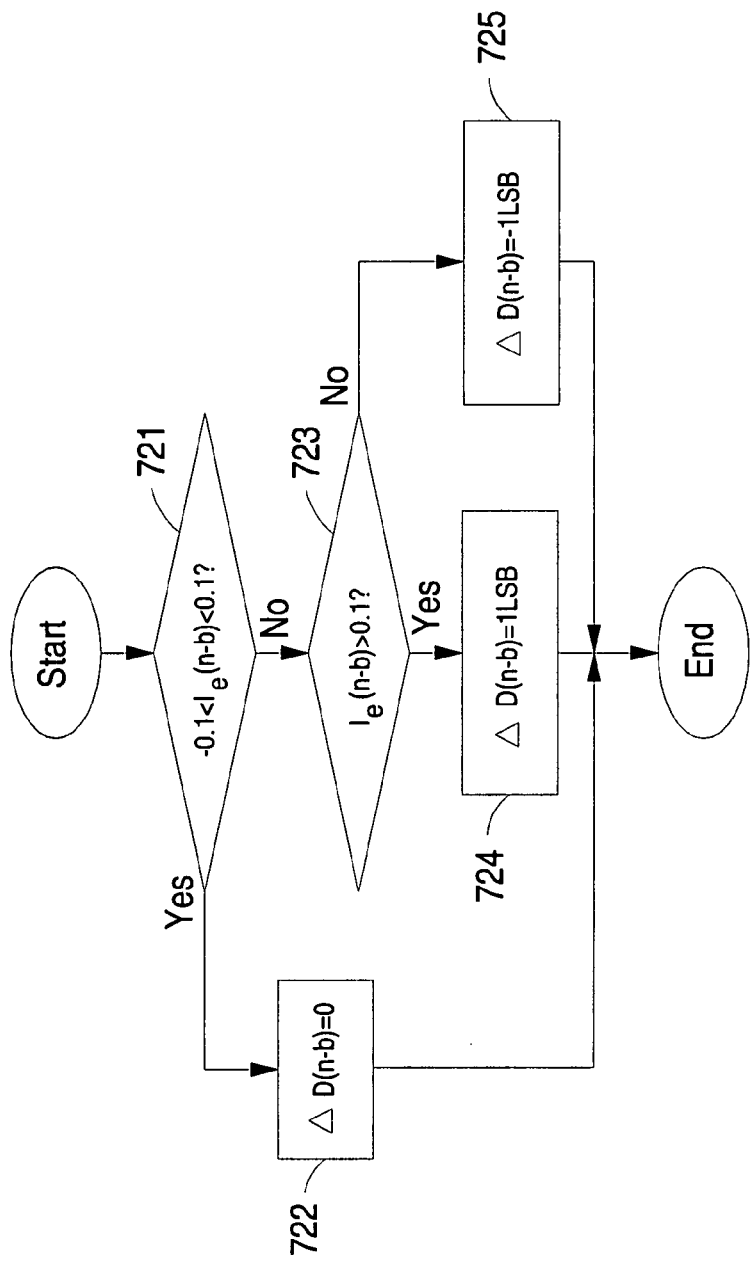

The method for calculating the bias regulation signal by the DC bias regulation loop 502 according to the bias current $I_e(n-b)$ in the $(n-b)^{th}$ switching cycle outputted from the DC bias calculation loop 501 will be described as follows. FIG. 7(A) is the flowchart illustrating the procedural steps for calculating the bias regulation signal by the bias regulation loop 502. In the beginning, the DC bias regulation loop 502 determines if the bias current $I_e(n-b)$ in the $(n-b)^{th}$ switching cycle falls within a predetermined tolerance range, for example, from −0.1 A to 0.1 A, as indicated by step 701. If $I_e(n-b)$ falls within the tolerance range from −0.1 A to 0.1 A, the method continues with step 702 to equalize the bias regulation signal in the $(n-b)^{th}$ switching cycle with the bias regulation signal in the $(n-b-1)^{th}$ switching cycle, that is, ΔD(n−b)=ΔD(n−b−1). If $I_e(n-b)$ does not fall within the tolerance range from −0.1 A to 0.1 A, the method continues with step 703 to determine if $I_e(n-b)$ is larger than 0.1 A. If $I_e(n-b)$ is larger than 0.1 A, the method continues with step 704 to determine if $I_e(n-b)$ is larger than or equal to the bias current $I_e(n-b-1)$ in the $(n-b-1)^{th}$ switching cycle. If $I_e(n-b)$ is larger than or equal to $I_e(n-b-1)$, it indicates that the current bias regulation signal is insufficient to compensate the flux difference of the primary winding of the transformer T1 between the positive half-cycle and the negative half-cycle. Under this condition, the method continues with step 705 to set the bias regulation signal ΔD(n−b) in the $(n-b)^{th}$ switching cycle as the bias regulation signal ΔD(n−b−1) in the $(n-b-1)^{th}$ switching cycle plus a predetermined regulation amount, for example, a least significant bit (LSB), that is, ΔD(n−b)=ΔD(n−b−1)+1LSB. If $I_e(n-b)$ is smaller than $I_e(n-b-1)$, it indicates that the current bias regulation signal is sufficient to compensate the flux difference of the primary winding of the transformer T1 between the positive half-cycle and the negative half-cycle. Under this condition, the method continues with step 706 to equalize the bias regulation signal in the $(n-b)^{th}$ switching cycle with the bias regulation signal in the $(n-b-1)^{th}$ switching cycle, that is, ΔD(n−b)=ΔD(n−b−1). If $I_e(n-b)$ is smaller than −0.1 A, the method continues with step 707 to determine if $I_e(n-b)$ is smaller than or equal to $I_e(n-b-1)$. If $I_e(n-b)$ is smaller than or equal to $I_e(n-b-1)$, the method continues with step 708 to set the bias regulation signal ΔD(n−b) in the $(n-b)^{th}$ switching cycle as the bias regulation signal ΔD(n−b−1) in the $(n-b-1)^{th}$ switching cycle minus a predetermined regulation amount, for example, a least significant bit (LSB), that is, ΔD(n−b)=ΔD(n−b−1)−1LSB. If $I_e(n-b)$ is larger than $I_e(n-b-1)$, the method continues with step 709 to equalize the bias regulation signal in the $(n-b)^{th}$ switching cycle with the bias regulation signal in the $(n-b-1)^{th}$ switching cycle, that is, ΔD(n−b)=ΔD(n−b−1). Hence, the DC bias regulation loop 502 can calculate the bias regulation signal according to the magnitude and tendency of the bias current, so that the bias current can be readily restrained within the tolerance range set by the DC bias regulation loop 502 to avoid the undue regulation over the bias current.

FIG. 7(B) is a flowchart illustrating alternative procedural steps for calculating the bias regulation signal by the DC bias regulation loop 502. The procedure of FIG. 7(B) is derived by simplifying the procedure of FIG. 7(A) under the condition that the undue regulation over the bias current is not to be taken into account. In the beginning, the DC bias regulation loop 502 will determine if the bias current $I_e(n-b)$ in the $(n-b)^{th}$ switching cycle falls within a predetermined tolerance range, for example, from −0.1 A to 0.1 A, as indicated by step 711. If the bias current $I_e(n-b)$ in the $(n-b)^{th}$ switching cycle falls within the tolerance range from −0.1 A to 0.1 A, the method continues with step 712 to equalize the bias regulation signal in the $(n-b)^{th}$ switching cycle with the bias regulation signal in the $(n-b-1)^{th}$ switching cycle, that is, $\Delta D(n-b)=\Delta D(n-b-1)$. If $I_e(n-b)$ does not fall within the tolerance range from −0.1 A to 0.1 A, the method continues with step 713 to determine if $I_e(n-b)$ is larger than 0.1 A. If $I_e(n-b)$ is larger than 0.1 A, the method continues with step 714 to set the bias regulation signal $\Delta D(n-b)$ in the $(n-b)^{th}$ switching cycle as the bias regulation signal $\Delta D(n-b-1)$ in the $(n-b-1)^{th}$ switching cycle plus a predetermined regulation amount, for example, a least significant bit (LSB), that is, $\Delta D(n-b)=\Delta D(n-b-1)+1LSB$. If $I_e(n-b)$ is not larger than 0.1 A, the method continues with step 715 to set the bias regulation signal $\Delta D(n-b)$ in the $(n-b)^{th}$ switching cycle as the bias regulation signal $\Delta D(n-b-1)$ in the $(n-b-1)^{th}$ switching cycle minus a predetermined regulation amount, for example, a least significant bit (LSB), that is, $\Delta D(n-b)=\Delta D(n-b-1)-1LSB$.

When the difference of the magnetizing time of the transformer between the positive half-cycle and the negative half-cycle is smaller than a least significant bit (LSB), the bias regulation signal can be straightforwardly set as a least significant bit. In this case, the control flow of FIG. 7(A) can be further simplified to that shown in FIG. 7(C). The procedural steps of method shown in FIG. 7(C) are described as follows. In the beginning, the DC bias regulation loop 502 will determine if the bias current $I_e(n-b)$ falls within the tolerance range from −0.1 A to 0.1 A, as indicated by step 721. If $I_e(n-b)$ falls within the tolerance range from −0.1 A to 0.1 A, the method continues with step 722 to set the bias regulation signal in the $(n-b)^{th}$ switching cycle as zero. If $I_e(n-b)$ does not fall within the tolerance range from −0.1 A to 0.1 A, the method continues with step 723 to determine if $I_e(n-b)$ is larger than 0.1 A. If $I_e(n-b)$ is larger than 0.1 A, the method continues with step 724 to set the bias regulation signal $\Delta D(n-b)$ in the $(n-b)^{th}$ switching cycle as a least significant bit. If $I_e(n-b)$ is not larger than 0.1 A, the method continues with step 725 to set the bias regulation signal $\Delta D(n-b)$ in the $(n-b)^{th}$ switching cycle as a negative least significant bit.

Figure 8:
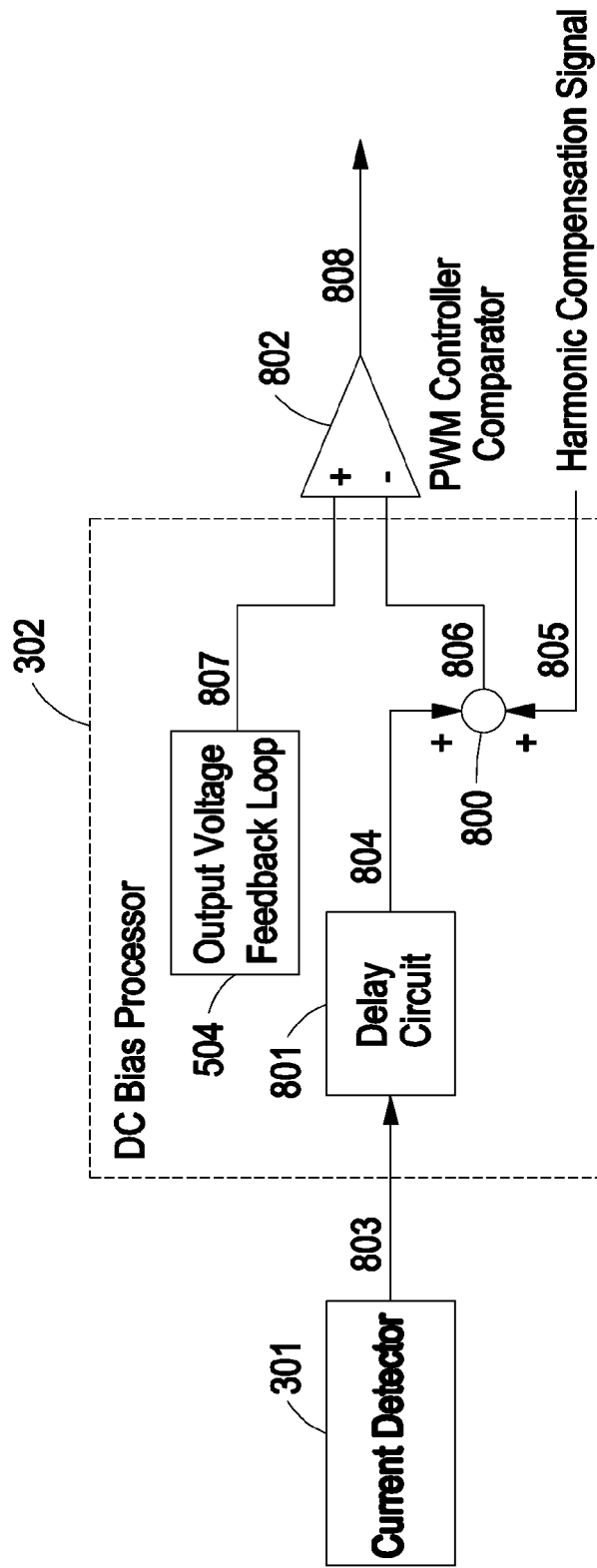
FIG. 8(A) show the structure of the current detector and the DC bias processor according to a second embodiment of the present invention.
FIG. 8(B) shows the structure of the delay circuit of FIG. 8(A)
FIG. 8(C) is a waveform diagram showing the current waveforms and voltage waveforms measured at the detecting nodes of FIG. 8(A)
FIG. 8(D) a show a different topology for the current detector and the DC bias processor according to a second embodiment of the present invention.

In a second embodiment of the present invention, the implementation of the DC bias processor 302 can be used to achieve the flux bias regulation method by current compensation. FIG. 8(A) shows the structure of the current detector and the DC bias processor according to the second embodiment of the present invention. Referring to FIG. 1, FIG. 3 and FIG. 8(A), the current detector 301 is used to detect the primary current of the transformer T1. In the present embodiment, the DC bias processor 302 includes a delay circuit 801 that is connected to the current detector 301 and configured to delay the waveforms of the sampled bus current 803 in the positive half-cycle and in the negative half-cycle for one or more switching cycles and obtain a delayed current signal 804 accordingly. The delayed current signal 804 outputted from the delay circuit 801 will be added up with a harmonic compensation signal 805 through an adder/subtracter loop 800 and obtain a composite signal 806 accordingly. The composite signal 806 will be fed to the negative input terminal of a PWM controller comparator 802. The output 807 of the feedback voltage loop 504 will be fed to the positive input terminal of the PWM controller comparator 802. The PWM controller comparator 802 is configured to compare the output 807 of the feedback voltage loop 504 with the composite signal 806 and output an ultimate control signal 808 to generate the driving signals for the switching circuit (Q1, Q2, Q3, Q4).

Figure 8B:
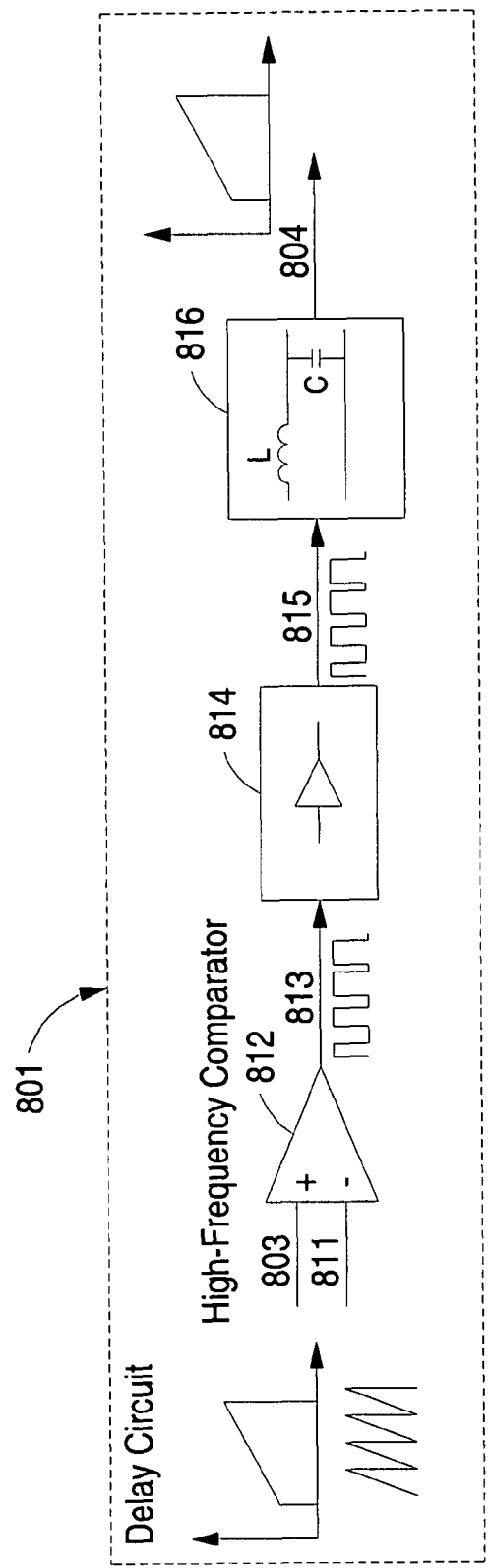

Referring to FIG. 8(B), the structure of the delay circuit 801 of FIG. 8(A) is shown. As shown in FIG. 8(B), the delay circuit 801 includes a high-frequency comparator 812 that is configured to compare the sampled current signal 803 outputted from the current detector 301 with a high-frequency carrier signal 811 so as to perform a chopping operation to the sampled current signal 803. Thus, a high-frequency pulse signal 813 is obtained. The high-frequency pulse signal 813 is processed by a logic gate circuit 814 so as to be delayed for a certain amount of switching cycles, for example, a switching cycle Ts, thereby generating a delayed high-frequency pulse signal 815. The delayed high-frequency pulse signal 815 is filtered by a LC filter 816 to generate a delayed current signal 804.

Figure 8C:
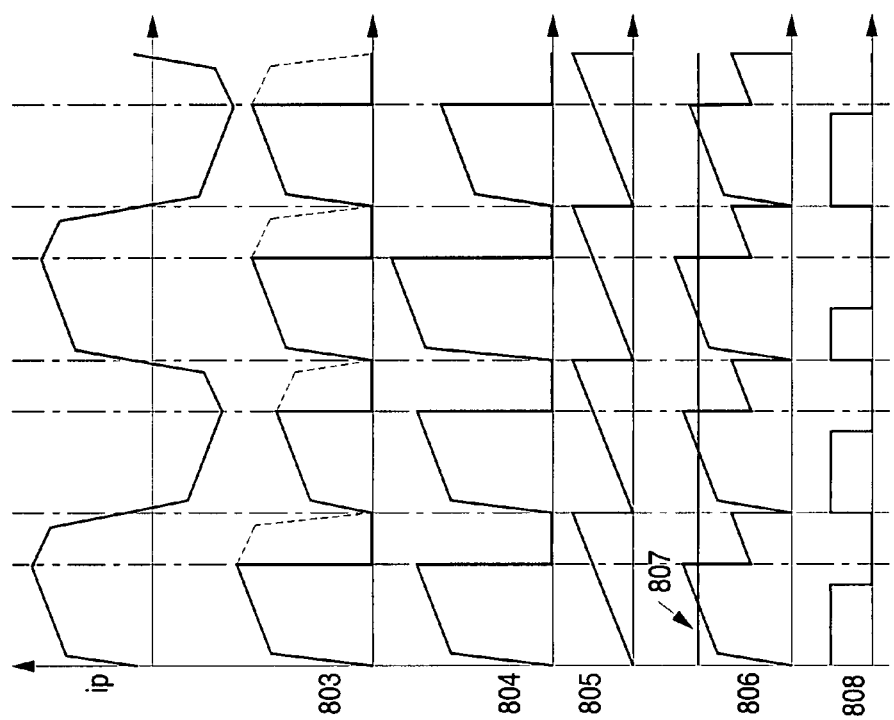

Referring to FIG. 8(C), the current waveforms and the voltage waveforms measured at the detecting nodes of FIG. 8(A) are shown. As shown in FIG. 8(C), ip denotes the primary current of the transformer T1; the waveform of 803 denotes the sampled current signal detected by the current detector 301; the waveform of 804 denotes the delayed sampled current signal derived by delaying the sampled current signal for one switching cycle Ts; the waveform of 805 denotes the harmonic compensation signal; the waveform of 806 denotes the composite signal derived by adding the delayed sampled current signal 804 and the harmonic compensation signal 805; the waveform of 807 denotes the voltage of the feedback signal 807 outputted from the feedback voltage loop 504; and the waveform of 808 denotes the ultimate control signal 808.

Figure 8D:
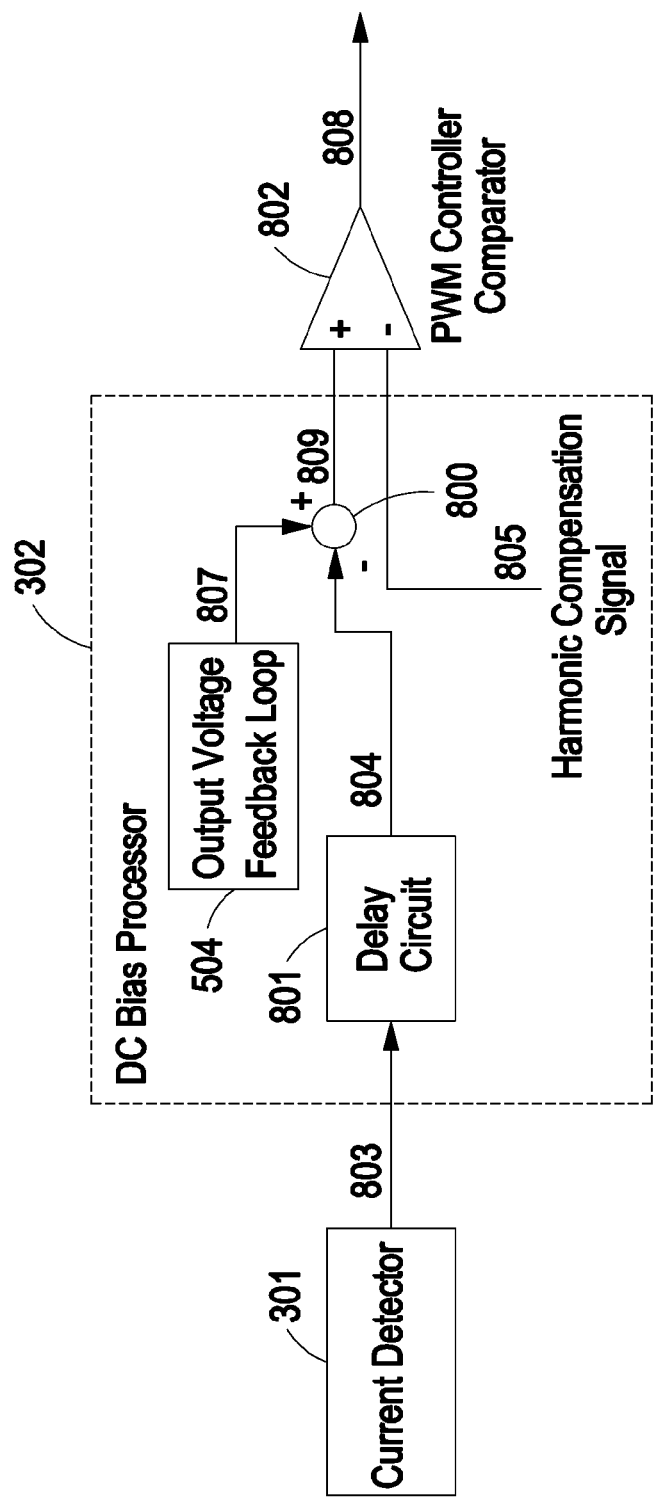

Referring to FIG. 1, FIG. 3 and FIG. 8(D), wherein FIG. 8(D) illustrates an alternative topology for the current detector and the DC bias processor according to the second embodiment of the present invention. Compared with FIG. 8(A), it can be understood that the circuitry of FIG. 8(D) allows the delayed sampled current signal 804 to compensate the feedback signal 807 outputted from the feedback voltage loop 504 so as to achieve flux bias regulation. As shown in FIG. 8(D), the delayed sampled current signal 804 is subtracted from the feedback signal 807 outputted from the feedback voltage loop 504 and a differential signal 809 is obtained accordingly. The differential signal 809 is fed to the positive input terminal of the PWM controller comparator 802, and the harmonic compensation signal 805 is fed to the negative input terminal of the PWM controller comparator 802. Through the comparison by the PWM controller comparator 802, an ultimate control signal 808 is obtained for generating the pulse signals to drive the switch circuit (Q1, Q2, Q3, Q4).

Figure 9:
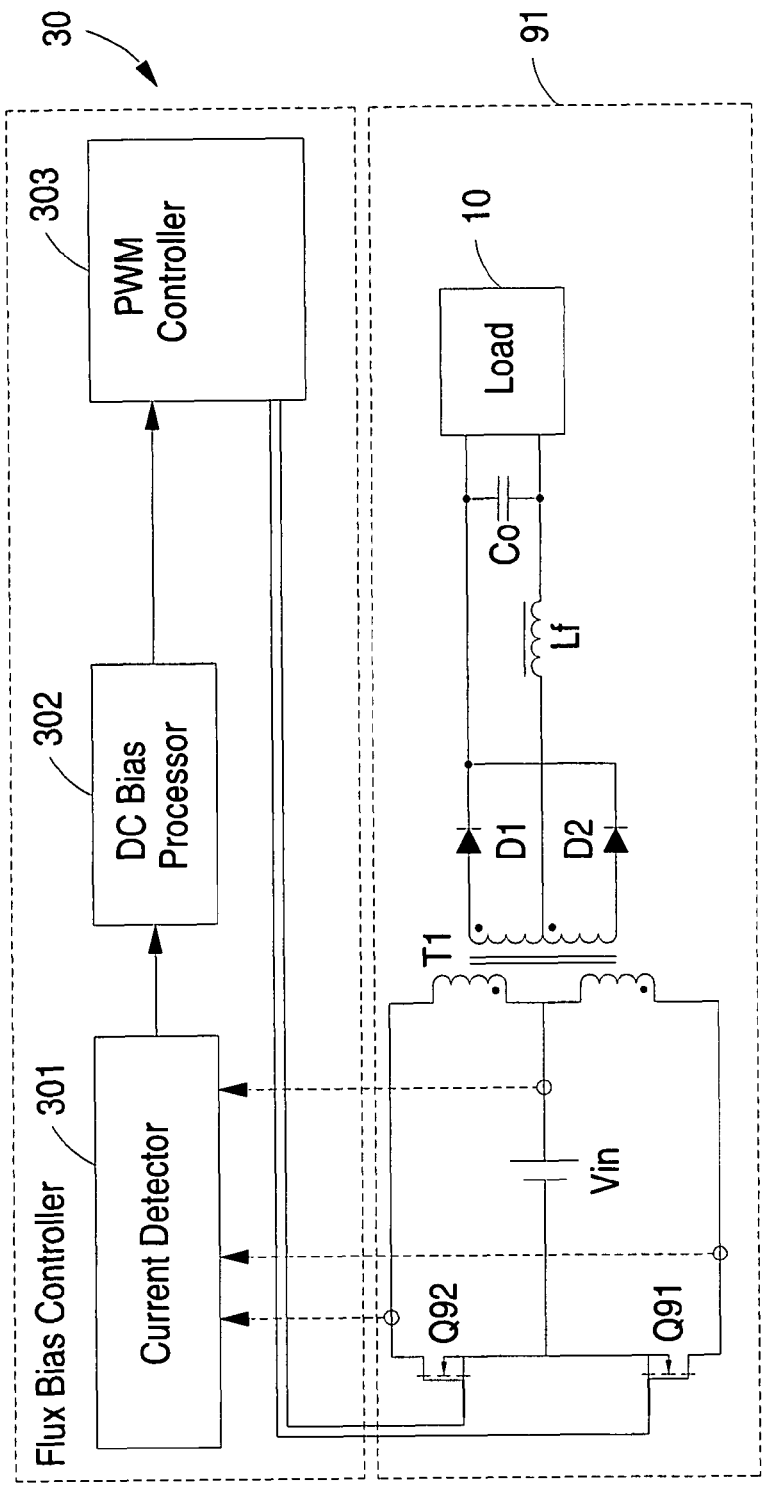
FIG. 9 is a circuit diagram showing a push-pull DC-DC converter incorporating the flux bias controller of the present invention.

FIG. 9 is a circuit diagram showing a push-pull DC-DC converter incorporating the flux bias controller according to the present invention. As shown in FIG. 9, a push-pull DC-DC converter 91 includes a switching circuit (Q91, Q92), a transformer T1, a rectifier (D1, D2) and an output filter (Lf, Co). The flux bias controller 30 is connected to the switching circuit (Q91, Q92) of the push-pull DC-DC converter 91, and is configured to regulate the DC bias of the transformer T1 of the push-pull DC-DC converter 91. The flux bias controller 30 includes a current detector 301, a DC bias processor 302 and a pulse-width modulation controller 303, in which the circuit architecture and the operating theorem of these circuit elements have been discussed in detail, and it is not intended to address the details herein.

Figure 10:
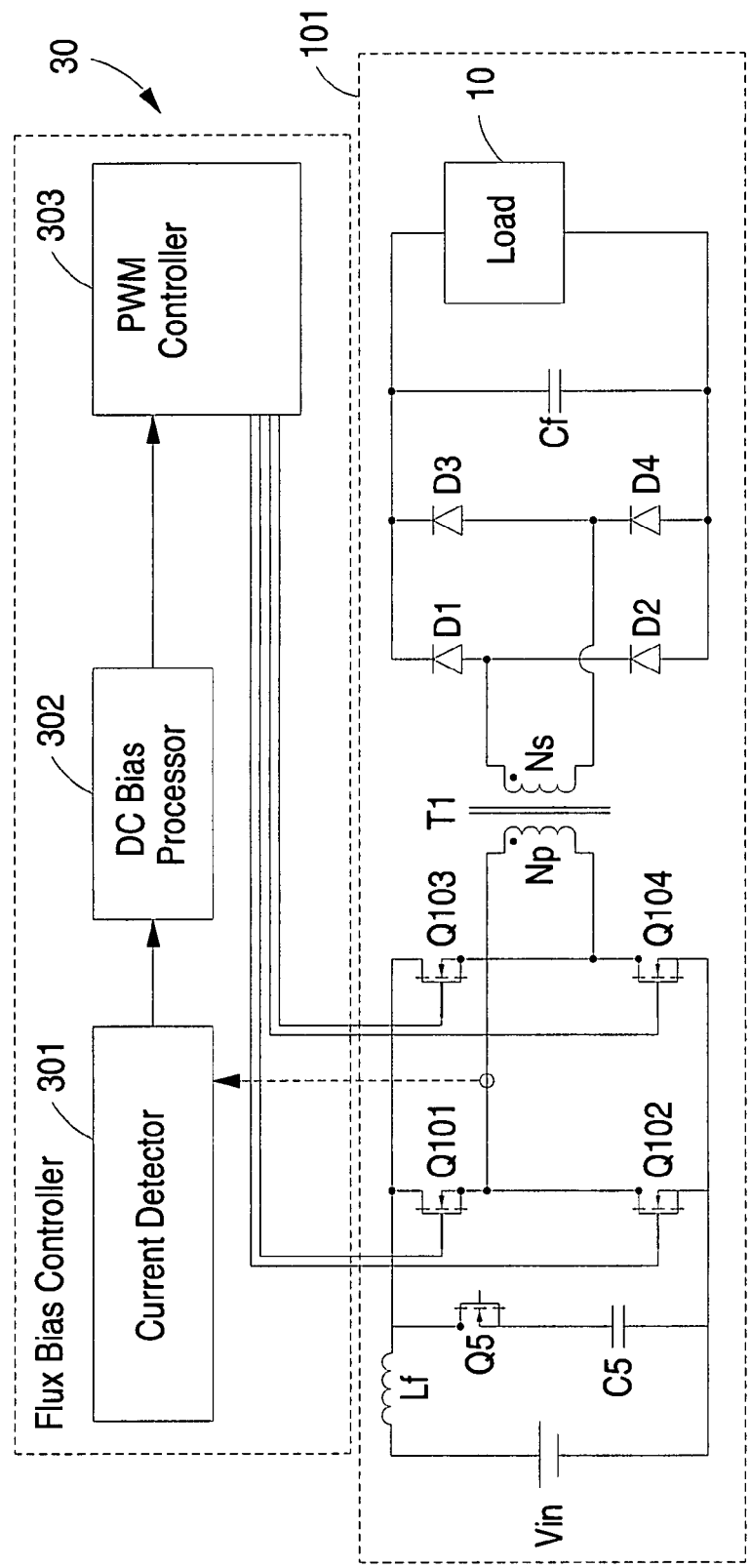
FIG. 10 is a circuit diagram showing a current-driven full-bridge DC-DC converter incorporating the flux bias controller of the present invention.

FIG. 10 is a circuit diagram showing a current-driven full-bridge DC-DC converter incorporating the flux bias controller according to the present invention. As shown in FIG. 10, the flux bias controller 30 is connected to the switching circuit (Q101, Q102, Q103, Q104) of the current-driven full-bridge DC-DC converter 101, and is configured to regulate the DC bias of the transformer T1 of the current-driven full-bridge DC-DC converter 101. The flux bias controller 30 includes a current detector 301, a DC bias processor 302 and a pulse-width modulation controller 303, in which the circuit architecture and the operating theorem of these circuit elements have been discussed in detail, and it is not intended to address the details herein.

In conclusion, the present invention proposes a flux bias controller for use in a power converter having a transformer that needs to be bi-directionally magnetized. The flux bias controller according to the present invention includes a current detector for detecting the primary current of the transformer in a certain switching cycle and thus outputting a sampled primary current. The flux bias controller according to the present invention further includes a DC bias processor for calculating a duty ratio control signal to regulate the DC bias of the transformer in the posterior switching cycle according to the sampled primary current outputted from the current detector. In addition, the flux bias controller according to the present invention further includes a pulse-width modulation controller for regulating the duty ratio of the switching circuit of the power converter according to the duty ratio control signal. Therefore, the flux bias controller according to the present invention can calculate the duty ratio of the switching circuit in a posterior switching cycle according to the primary current detected in a certain switching cycle, and thereby regulating the DC bias of the transformer and reducing the real-time accuracy of DC bias regulation operation of the transformer.

Those of skilled in the art will recognize that these and other modifications can be made within the spirit and scope of the present invention as further defined in the appended claims.

What is claimed is:

1. A flux bias regulation method for use in a power converter having a switching circuit and a transformer, wherein the switching circuit is configured to turn on and off according to a predetermined period and the transformer is configured to be bi-directionally magnetized according to on/off operations of the switching circuit, the method comprising the steps of:
   detecting a primary current of the transformer in the switching cycle (n–b)Ts prior to a predetermined switching cycle nTs;
   delaying a detected current signal for at least one switching cycle;
   subtracting the delayed current signal from a feedback signal to obtain a differential signal; and
   comparing the differential signal with a harmonic compensation signal and in response thereto obtaining a driving signal to drive the switching circuit, thereby regulating a duty ratio of the switching circuit to suppress the DC bias of the transformer.

2. A power converter comprising:
   a switching circuit for converting an input voltage into a first voltage according to its on/off operations;
   a transformer having a primary side and a secondary side, wherein the primary side is configured to receive the first voltage from the switching circuit and transfer the first voltage to the secondary side according to the on/off operations of the switching circuit; and
   a flux bias controller connected to the switching circuit for detecting a primary current of the transformer and in response thereto generating a duty ratio control signal, and generating driving signals to drive the switching circuit according to the duty ratio control signal, wherein the flux bias controller includes:
      a current detector for detecting a primary current in the transformer in a switching cycle prior to a predetermined switching cycle;
      a DC bias processor connected to the current detector for generating a duty ratio control signal according to an output signal of the current detector for suppressing a bias current of the transformer in the predetermined switching cycle, wherein the DC bias processor comprises:
         a DC bias calculation loop connected to the current detector for calculating a bias current of the transformer in the switching cycle prior to the predetermined switching cycle according to the output of the current detector;
         a DC bias regulation loop for calculating a bias regulation signal in the switching cycle prior to the predetermined switching cycle according to the bias current outputted from the DC bias calculation loop;
         a delay loop for delaying the bias regulation signal outputted from the DC bias regulation loop until the predetermined switching cycle;
         a feedback voltage loop for detecting a variation on an output voltage of the power converter and in response thereto generating a feedback signal; and
         an adder/subtracter loop for performing an adding/subtracting operation to a delayed bias regulation signal outputted from the delay loop and the feedback signal outputted from the feedback voltage loop so as to generate a duty ratio control signal; and
      a pulse-width modulation controller connected to the DC bias processor for generating driving signals to drive the switching circuit according to the duty ratio control signal.

3. The power converter according to claim 2 wherein the flux bias controller further includes an analog-to-digital converter connected between the current detector and the DC bias calculation loop for converting the output signal of the current detector into a digital format signal.

4. The power converter according to claim 2 wherein the power converter is a DC-DC converter.

5. The power converter according to claim 4 wherein the DC-DC converter is a full-bridge DC-DC converter or a current-driven full-bridge DC-DC converter.

6. The power converter according to claim 5 wherein the current detector is configured to detect a leading leg current or a lagging leg current of the power converter.

7. A power converter comprising:
   a switching circuit for converting an input voltage into a first voltage according to its on/off operations;
   a transformer having a primary side and a secondary side, wherein the primary side is configured to receive the first voltage from the switching circuit and transfer the first voltage to the secondary side according to the on/off operations of the switching circuit; and
   a flux bias controller connected to the switching circuit for detecting a primary current of the transformer and in response thereto generating a duty ratio control signal, and generating driving signals to drive the switching circuit according to the duty ratio control signal, wherein the flux bias controller includes:

a current detector for detecting a primary current in the transformer in a switching cycle prior to a predetermined switching cycle;

a DC bias processor connected to the current detector for generating a duty ratio control signal according to an output signal of the current detector for suppressing a bias current of the transformer in the predetermined switching cycle;

wherein the DC bias processor comprises:

a delay circuit connected to the current detector for delaying the output signal of the current detector by at least one switching cycle;

a feedback voltage loop for detecting a variation on an output voltage of the power converter and in response thereto generating a feedback signal; and an adder/subtracter loop for adding an output signal of the delay circuit and a harmonic compensation signal together to generate a composite signal, or subtracting an output signal of the delay circuit from the feedback signal to generate a differential signal; and a pulse-width modulation controller connected to the DC bias processor for generating driving signals to drive the switching circuit according to the duty ratio control signal.

8. The power converter according to claim 7 wherein the delay circuit comprises:

a high-frequency comparator connected to the current detector and having a positive input terminal for receiving the output signal of the current detector and a negative input terminal for receiving a high-frequency carrier signal, the high-frequency comparator is configured to compare the output signal of the current detector with the high-frequency carrier signal and in response thereto generate a high-frequency pulse signal;

a logic gate circuit connected to the high-frequency comparator for delaying the high-frequency pulse signal by at least one switching cycle; and a filter connected to the logic gate circuit for performing a filtering operation to a delayed high-frequency pulse signal outputted from the logic gate circuit to generate a delayed current signal.

9. A flux bias regulation method for use in a power converter having a switching circuit and a transformer, wherein the switching circuit is configured to turn on and off according to a predetermined period and the transformer is configured to be bi-directionally magnetized according to on/off operations of the switching circuit, the method comprising the steps of:

detecting a primary current of the transformer in a switching cycle (n−a)Ts and a primary current of the transformer in a switching cycle (n−b)Ts prior to a predetermined switching cycle nTs, where n is a positive integer, Ts is a switching period, a and b are both positive integers, and n>b and b≧a;

calculating a bias current in the switching cycle (n−b)Ts prior to the predetermined switching cycle nTs according to a detected primary current;

calculating a bias regulation signal in the predetermined switching cycle nTs according to the bias current in the switching cycle (n−b)Ts;

performing an arithmetical operation to the bias regulation signal and an output voltage feedback signal and obtaining a duty ratio control signal accordingly; and issuing a driving signal by a pulse-width modulation controller according to the duty ratio control signal to drive the switching circuit, thereby regulating a duty ratio of the switching circuit to suppress the DC bias of the transformer.

10. The flux bias regulation method according to claim 9 wherein the step of calculating a bias regulation signal $\Delta D(n)$ in the predetermined switching cycle nTs according to the bias current $I_e(n-b)$ in the switching cycle (n−b)Ts prior to the predetermined switching cycle nTs further includes the steps of:

determining if $I_e(n-b)$ falls within a tolerance range;

if $I_e(n-b)$ falls within the tolerance range, setting the bias regulation signal $\Delta D(n-b)$ in the switching cycle (n−b)Ts prior to the predetermined switching cycle nTs as zero;

if $I_e(n-b)$ does not fall within the tolerance range, determining if $I_e(n-b)$ is larger than an upper limit of the tolerance range;

if $I_e(n-b)$ is larger than the upper limit of the tolerance range, setting the bias regulation signal $\Delta D(n-b)$ in the switching cycle (n−b)Ts prior to the predetermined switching cycle nTs as a predetermined regulation amount;

if $I_e(n-b)$ is not larger than the upper limit of the tolerance range, setting the bias regulation signal $\Delta D(n-b)$ in the switching cycle (n−b)Ts prior to the predetermined switching cycle nTs as a negative predetermined regulation amount; and setting the bias regulation signal $\Delta D(n)$ in the predetermined switching cycle nTs as the bias regulation signal $\Delta D(n-b)$ in the switching cycle (n−b)Ts prior to the predetermined switching cycle nTs.

11. The flux bias regulation method according to claim 10 wherein the tolerance range ranges from −0.1 A to 0.1 A.

12. The flux bias regulation method according to claim 9 wherein the step of calculating a bias current in the switching cycle (n−b)Ts prior to the predetermined switching cycle nTs further includes the steps of:

detecting a primary current $I_+(n-a)$ of the transformer in the positive half-cycle of the switching cycle (n−a)Ts prior to the predetermined switching cycle nTs;

detecting a primary current $I_-(n-b)$ of the transformer in the negative half-cycle of the switching cycle (n−b)Ts prior to the predetermined switching cycle nTs; and subtracting $I_-(n-b)$ from $I_+(n-a)$ to obtain a bias current $I_e(n-b)$ in the switching cycle (n−b)Ts prior to the predetermined switching cycle nTs.

13. The flux bias regulation method according to claim 12 wherein:

the primary current $I_+(n-a)$ of the transformer in the positive half-cycle of the switching cycle (n−a)Ts prior to the predetermined switching cycle nTs is a peak current $I_{pk+}(n-a)$; and the primary current $I_-(n-b)$ of the transformer in the negative half-cycle of the switching cycle (n−b)Ts prior to the predetermined switching cycle nTs is a peak current $I_{pk-}(n-b)$.

14. The flux bias regulation method according to claim 9 wherein the step of calculating a bias regulation signal $\Delta D(n)$ in the predetermined switching cycle nTs according to the bias current $I_e(n-b)$ in the switching cycle (n−b)Ts prior to the predetermined switching cycle nTs further includes the steps of:

determining if $I_e(n-b)$ falls within a tolerance range;

if $I_e(n-b)$ falls within the tolerance range, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$;

if $I_e(n-b)$ does not fall within the tolerance range, determining if $I_e(n-b)$ is larger than an upper limit of the tolerance range;

if $I_e(n-b)$ is larger than the upper limit of the tolerance range, determining if $I_e(n-b)$ is larger than or equal to the bias current $I_e(n-b-1)$ in the switching cycle $(n-b-1)Ts$ prior to the predetermined switching cycle $nTs$;

if $I_e(n-b)$ is not larger than the upper limit of the tolerance range, determining if $I_e(n-b)$ is smaller than or equal to $I_e(n-b-1)$;

if $I_e(n-b)$ is larger than the upper limit of the tolerance range and $I_e(n-b)$ is larger than or equal to $I_e(n-b-1)$, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$ plus a predetermined regulation amount;

if $I_e(n-b)$ is larger than the upper limit of the tolerance range and $I_e(n-b)$ is smaller than $I_e(n-b-1)$, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$;

if $I_e(n-b)$ is not larger than the upper limit of the tolerance range and $I_e(n-b)$ is smaller than or equal to $I_e(n-b-1)$, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$ minus a predetermined regulation amount;

if $I_e(n-b)$ is not larger than the upper limit of the tolerance range and $I_e(n-b)$ is larger than $I_e(n-b-1)$, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$; and setting the bias regulation signal $\Delta D(n)$ in the predetermined switching cycle $nTs$ as the bias regulation signal $\Delta D(n-b)$ in the switching cycle $(n-b)Ts$ prior to the predetermined switching cycle $nTs$.

15. The flux bias regulation method according to claim 14 wherein the tolerance range ranges from −0.1 A to 0.1 A.

16. The flux bias regulation method according to claim 9 wherein the step of calculating a bias regulation signal $\Delta D(n)$ in the predetermined switching cycle $nTs$ according to the bias current $I_e(n-b)$ in the switching cycle $(n-b)Ts$ prior to the predetermined switching cycle $nTs$ further includes the steps of:

determining if $I_e(n-b)$ falls within a tolerance range;

if $I_e(n-b)$ falls within the tolerance range, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$;

if $I_e(n-b)$ does not fall within the tolerance range, determining if $I_e(n-b)$ is larger than an upper limit of the tolerance range;

if $I_e(n-b)$ is larger than the upper limit of the tolerance range, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$ plus a predetermined regulation amount;

if $I_e(n-b)$ is not larger than the upper limit of the tolerance range, setting the bias regulation signal $\Delta D(n-b)$ in the switching cycle $(n-b)Ts$ prior to the predetermined switching cycle $nTs$ as the bias regulation signal $\Delta D(n-b-1)$ in the switching cycle $(n-b-1)Ts$ prior to the predetermined switching cycle $nTs$ minus a predetermined regulation amount; and setting the bias regulation signal $\Delta D(n)$ in the predetermined switching cycle $nTs$ as the bias regulation signal $\Delta D(n-b)$ in the switching cycle $(n-b)Ts$ prior to the predetermined switching cycle $nTs$.

17. The flux bias regulation method according to claim 16 wherein the tolerance range ranges from −0.1 A to 0.1 A.

18. A flux bias regulation method for use in a power converter having a switching circuit and a transformer, wherein the switching circuit is configured to turn on and off according to a predetermined period and the transformer is configured to be bi-directionally magnetized according to on/off operations of the switching circuit, the method comprising the steps of:

detecting a primary current of the transformer in the switching cycle $(n-b)Ts$ prior to a predetermined switching cycle $nTs$;

delaying a detected current signal for at least one switching cycle;

adding the delayed current signal and a harmonic compensation signal together to obtain a composite signal; and comparing a feedback signal with the composite signal and in response thereto obtaining a driving signal to drive the switching circuit, thereby regulating a duty ratio of the switching circuit to suppress the DC bias of the transformer.

* * * * *